United States Patent
Chevroulet et al.

(10) Patent No.: US 9,574,907 B2
(45) Date of Patent: Feb. 21, 2017

(54) SEMICONDUCTOR DEVICE AND METHOD OF DIRECT MEASUREMENT AND ACQUISITION OF MEMS EMPLOYING SIGMA-DELTA LOOP

(71) Applicant: Semtech Corporation, Camarillo, CA (US)

(72) Inventors: Michel Chevroulet, Neuchatel (CH); Olivier Nys, Neuchatel (CH)

(73) Assignee: Semtech Corporation, Camarillo, CA (US)

( * ) Notice: Subject to any disclaimer, the term of this patent is extended or adjusted under 35 U.S.C. 154(b) by 428 days.

(21) Appl. No.: 14/159,926

(22) Filed: Jan. 21, 2014

(65) Prior Publication Data

US 2014/0266251 A1    Sep. 18, 2014

Related U.S. Application Data

(60) Provisional application No. 61/788,286, filed on Mar. 15, 2013.

(51) Int. Cl.
  *G01D 5/24*    (2006.01)
(52) U.S. Cl.
  CPC ........................ *G01D 5/24* (2013.01)
(58) Field of Classification Search
  USPC ... 324/661, 679, 750.25; 341/143, 120, 156; 73/514.32, 510, 718, 724; 702/104
  See application file for complete search history.

(56) References Cited

U.S. PATENT DOCUMENTS

| | | | |
|---|---|---|---|
| 7,561,086 B2 | 7/2009 | Nys | |
| 8,000,789 B2 | 8/2011 | Denison | |
| 8,134,375 B2 | 3/2012 | Boom | |
| 2003/0076249 A1 | 4/2003 | Dummermuth et al. | |
| 2007/0180924 A1 | 8/2007 | Warren et al. | |
| 2008/0062022 A1* | 3/2008 | Melanson | H03M 3/464 341/143 |
| 2008/0079444 A1* | 4/2008 | Denison | G01D 5/24 324/679 |
| 2008/0269631 A1* | 10/2008 | Denison | A61B 5/0478 600/544 |
| 2009/0204350 A1 | 8/2009 | Govil et al. | |
| 2010/0194615 A1* | 8/2010 | Lu | H03M 3/454 341/155 |
| 2010/0315272 A1 | 12/2010 | Steele et al. | |
| 2013/0051582 A1 | 2/2013 | Kropfitsch et al. | |

* cited by examiner

*Primary Examiner* — Melissa Koval
*Assistant Examiner* — Nasima Monsur
(74) *Attorney, Agent, or Firm* — Robert D. Atkins; Patent Law Group: Atkins and Associates, P.C.

(57) ABSTRACT

A semiconductor device measures a state of a MEMS as a first voltage variation at a sensing node. The state of the MEMS includes a capacitance. A first capacitor is coupled between the sensing node and an input of an integrator for transferring the first voltage variation to a second node as a first signal. A second voltage variation is routed through a second capacitor to the second node as a second signal. The integrator integrates the first signal and second signal to provide an integrated signal. An ADC has an input coupled to an output of the integrator and converts the integrated signal to a digital signal representative of the capacitance of the MEMS. A DAC has an input coupled to the output of the ADC. A second capacitor is coupled between an output of the DAC and the sensing node.

19 Claims, 7 Drawing Sheets

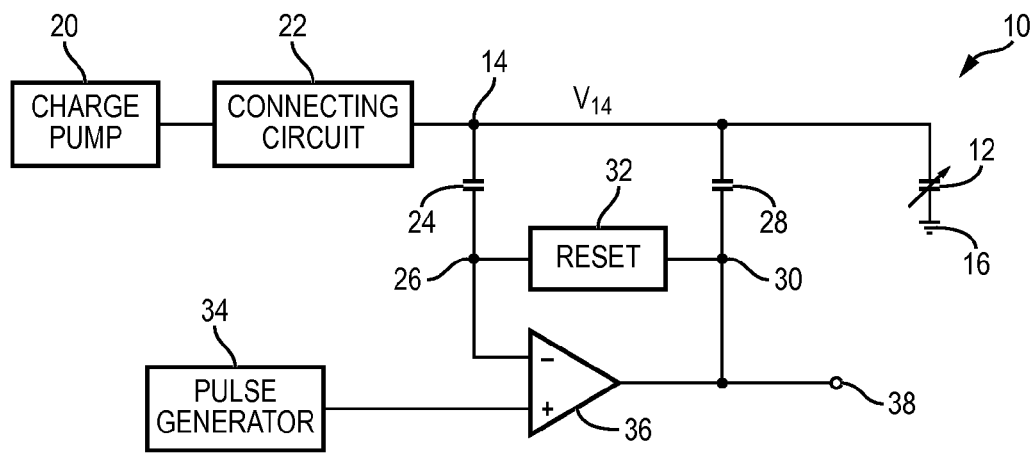
*FIG. 1*
(PRIOR ART)
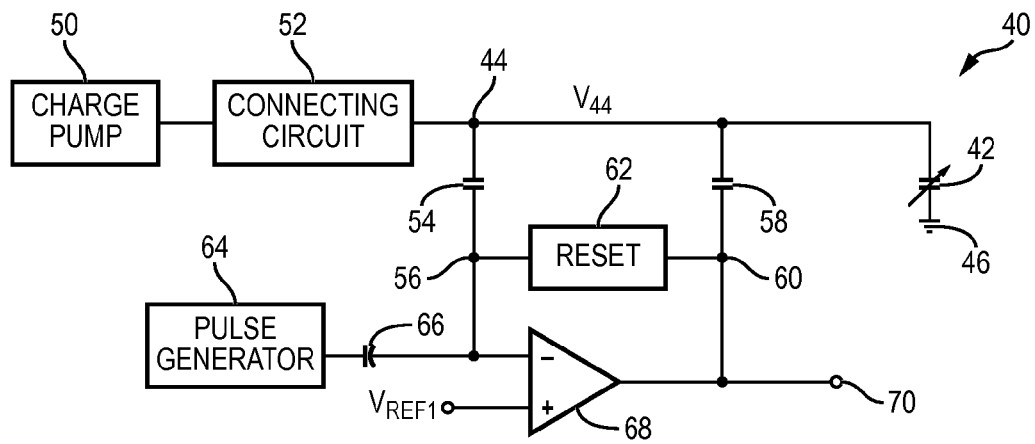
*FIG. 2*
(PRIOR ART)
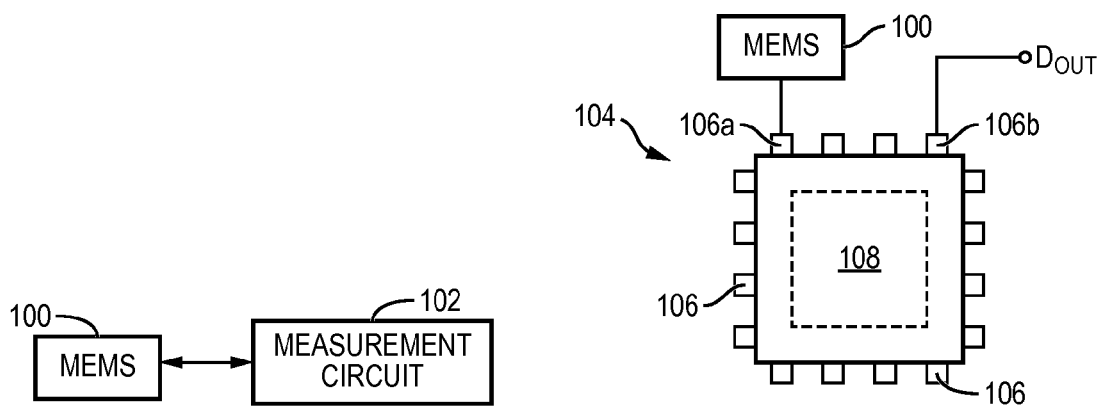
*FIG. 3*
*FIG. 4*

US 9,574,907 B2

SEMICONDUCTOR DEVICE AND METHOD OF DIRECT MEASUREMENT AND ACQUISITION OF MEMS EMPLOYING SIGMA-DELTA LOOP

CLAIM TO DOMESTIC PRIORITY

The present application claims the benefit of U.S. Provisional Application No. 61/788,286, filed Mar. 15, 2013, which application is incorporated herein by reference.

FIELD OF THE INVENTION

The present invention relates in general to semiconductor devices and, more particularly, to a measurement circuit and method of measuring a state of a MEMS using a sigma-delta loop.

BACKGROUND OF THE INVENTION

Semiconductor devices are commonly found in modern electronic products. Semiconductor devices vary in the number and density of electrical components. Integrated semiconductor devices typically contain hundreds to millions of electrical components. Examples of integrated semiconductor devices include microcontrollers, microprocessors, application specific integrated circuits (ASICs), and other specific functional circuits. Discrete semiconductor devices generally contain one type of electrical component, e.g., light emitting diode (LED), small signal transistor, resistor, capacitor, inductor, and power metal oxide semiconductor field effect transistor (MOSFET).

Semiconductor devices perform a wide range of functions such as signal processing, high-speed calculations, transmitting and receiving electromagnetic signals, controlling operation of electronic devices, and controlling movement of mechanical devices. Semiconductor devices are found in the fields of communications, power conversion, mechanical control, networks, computers, and consumer products. Semiconductor devices are also found in military applications, aviation, automotive, industrial controllers, and office equipment.

A microelectromechanical system (MEMS) is often used with the above semiconductor devices. For example, the MEMS can be a comb actuator, lens for cell phone camera, moveable mirror, accelerometer, or gyro. The MEMS may exhibit a capacitance from two electrodes or elements with a dielectric medium between the electrodes. The capacitance of the MEMS changes with the relative displacement or distance between the two electrodes. In the case of a lens for a camera, capacitance changes by movement of the focal point of the lens, or by movement of the lens with respect to a sensor, i.e., capacitance varies with displacement of the lens. The movement or displacement of the lens can be determined by measuring the capacitance of the MEMS. The present state and operation of the MEMS can be controlled by measuring changes in the effective capacitance.

FIG. 1 shows a conventional block and schematic diagram of measurement circuit 10 for measuring the capacitance of a MEMS, represented by variable capacitor 12 coupled between node 14 and terminal 16 operating at a ground potential. Charge pump 20 is coupled through connecting circuit 22 to node 14 to change the voltage across capacitor 12, which creates an electric field that imposes a force on the MEMS, e.g., to induce movement of one electrode of the MEMS capacitor. The value of MEMS capacitor 12 is then measured to determine the amount of the displacement or the new position of the electrode of the MEMS capacitor caused by application of the charge pump voltage. Connecting circuit 22 can be a transistor, resistor, or electronic switch. Capacitor 24 is coupled between node 14 and node 26, and capacitor 28 is coupled between node 14 and node 30. Reset circuit 32 can be a transistor or electronic switch coupled between node 26 and node 30. Pulse or step generator 34 has an output coupled to a non-inverting input of amplifier 36. The inverting input of amplifier 36 is coupled to node 26, and the output of amplifier 36 is coupled to node 30 at output terminal 38 of measurement circuit 10 to provide an analog output signal as a representative measurement of the value of capacitor 12.

Measurement circuit 10 provides an analog measurement of MEMS capacitor 12, i.e., the value of capacitor 12 is to be determined. Assume connecting circuit 22 and reset circuit 32 are closed or low impedance. The voltage from charge pump 20 is applied to capacitor 12 to cause displacement or change of state of the MEMS. Capacitors 24 and 28 isolate amplifier 36 from the high voltage from charge pump 20 on node 14, i.e., the voltage required to displace or change state of the MEMS can be greater than the breakdown voltage of the active amplifier. Capacitor 28 is coupled to node 14 to inject charges into MEMS capacitor 12. Capacitor 24 senses the change in the voltage at node 14 ($V_{14}$). Since reset circuit 32 is low impedance, the voltage of the inverting input of amplifier 36 is substantially equal to the output voltage of the amplifier, which is equal to the voltage at the non-inverting input of the amplifier from pulse generator 34.

Connecting circuit 22 and reset circuit 32 are opened or set to high impedance, i.e., connecting circuit 22 and reset circuit 32 are disabled during the measurement phase. Pulse generator 34 provides a pulse or step function $V_P$ to the non-inverting input of amplifier 36. Note that the voltage at the inverting input of amplifier 36 will be substantially the same as $V_P$ applied to the non-inverting input of the amplifier. The output of amplifier 36 changes to make the inverting input of the amplifier follow $V_P$. The output voltage of amplifier 36 changes based on a ratio of the capacitors and $V_P$, i.e., the output voltage of amplifier 36 in response to $V_P$ is impressed through capacitor 28 to cause a change in $V_{14}$ as a function of capacitor 12, which is then measured through capacitor 24 across the inputs of the amplifier and provided at the output of the amplifier. The value of capacitor 12 (displacement or state of the MEMS) is unknown due to the force applied by charge pump 20. Yet, the value of capacitor 12 can be determined from the change in $V_{14}$ as a function of capacitor 12 and provided as the analog output voltage of amplifier 36 at output terminal 38. The analog output voltage of amplifier 36 changes with the value of capacitor 12.

FIG. 2 shows another conventional block and schematic diagram of measurement circuit 40 for measuring the capacitance of a MEMS, represented by variable capacitor 42 coupled between node 44 and terminal 46 operating at a ground potential. Charge pump 50 is coupled through connecting circuit 52 to node 44 to change the voltage across capacitor 42, which creates an electric field that imposes a force on the MEMS, e.g., to induce movement of the lens. The value of MEMS capacitor 42 is then measured to determine the amount of the displacement or the new position or state of the MEMS caused by application of the charge pump voltage. Connecting circuit 52 can be a transistor, resistor, or electronic switch. Capacitor 54 is coupled between node 44 and node 56, and capacitor 58 is coupled between node 44 and node 60. Reset circuit 62 can be a transistor or electronic switch coupled between node 56 and node 60. Pulse or step generator 64 has an output coupled through capacitor 66 to an inverting input of amplifier 68. The non-inverting input of amplifier 68 receives DC reference voltage $V_{REF1}$. The inverting input of amplifier 68 is coupled to node 56, and the output of amplifier 68 is coupled to node 60 at output terminal 70 of measurement circuit 40 to provide an analog output signal representative measurement of the value of capacitor 42.

Assume connecting circuit 52 and reset circuit 62 are closed or low impedance. The voltage from charge pump 50 is applied to capacitor 42 to cause displacement or change of state of the MEMS. Capacitors 54 and 58 isolate amplifier 68 from the high voltage from charge pump 50 on node 44, i.e., the voltage required to displace a MEMS element can be greater than the breakdown voltage of the active amplifier. Connecting circuit 52 and reset circuit 62 are opened or set to high impedance, i.e., the connecting circuit and reset circuit are disabled during the measurement phase. Capacitor 58 is coupled to node 44 to inject charges into MEMS capacitor 42. Capacitor 54 senses the change in the voltage at node 44 ($V_{44}$). Pulse generator 64 provides a pulse or step function $V_P$ through capacitor 66 to the inverting input of amplifier 68. The output voltage of the amplifier 68 changes based on a ratio of the capacitors and $V_P$. Thus, the value of capacitor 42 can be determined from the variation of the analog output voltage of amplifier 68 and made available at output terminal 70.

The measurement of the MEMS capacitor uses conventional analog circuits, e.g., amplifier 36 or 68. The analog measurement value of the MEMS capacitor from amplifier 36 or 68 must be converted to a digital format, e.g., by an analog-to-digital converter (ADC) within the semiconductor die containing the measurement circuit or externally for further processing by digital circuits. The analog measurement of the MEMS capacitor may lack resolution needed in some applications.

SUMMARY OF THE INVENTION

A need exists to measure a MEMS with high resolution in a compact circuit layout. Accordingly, in one embodiment, the present invention is a measurement circuit for a MEMS comprising a sensing node for measuring a state of the MEMS. A first capacitor is coupled between the sensing node and an input of an integrator. An ADC includes an input coupled to an output of the integrator and an output providing a digital signal representative of the state of the MEMS. A DAC includes an input coupled to the output of the ADC. A second capacitor is coupled between an output of the DAC and the sensing node.

In another embodiment, the present invention is a method of measuring a MEMS comprising the steps of sensing a state of the MEMS as a first voltage variation at a sensing node, transferring the first voltage variation through a first capacitor to a second node as a first signal, providing a second voltage variation through a second capacitor to the second node as a second signal, integrating the first signal and second signal to provide an integrated signal, converting the integrated signal to a digital signal representative of the state of the MEMS, converting the digital signal to an analog signal, and routing the analog signal through a third capacitor to the sensing node.

In another embodiment, the present invention is a semiconductor device for measuring a MEMS comprising a sensing node for measuring the MEMS. A first capacitor is coupled between the sensing node and an input of a first integrator. An ADC includes an input coupled to an output of the first integrator and an output providing a digital signal representative of the state of the MEMS. A feedback circuit is coupled between the output of the ADC and the sensing node.

In another embodiment, the present invention is a method of measuring a MEMS comprising the steps of sensing a state of the MEMS as a first voltage variation at a sensing node, transferring the first voltage variation through a first capacitor to a second node as a first signal, integrating the first signal to provide an integrated signal, and converting the integrated signal to a digital signal representative of the state of the MEMS.

BRIEF DESCRIPTION OF THE DRAWINGS

FIG. 1 is a schematic and block diagram of a conventional measurement circuit for measuring capacitance of a MEMS;

FIG. 2 is a schematic and block diagram of another conventional measurement circuit for measuring capacitance of a MEMS;

FIG. 3 illustrates a MEMS and separate measurement circuit;

FIG. 4 illustrates a semiconductor package with external pins containing the measurement circuit;

DETAILED DESCRIPTION OF THE DRAWINGS

Figure 5:
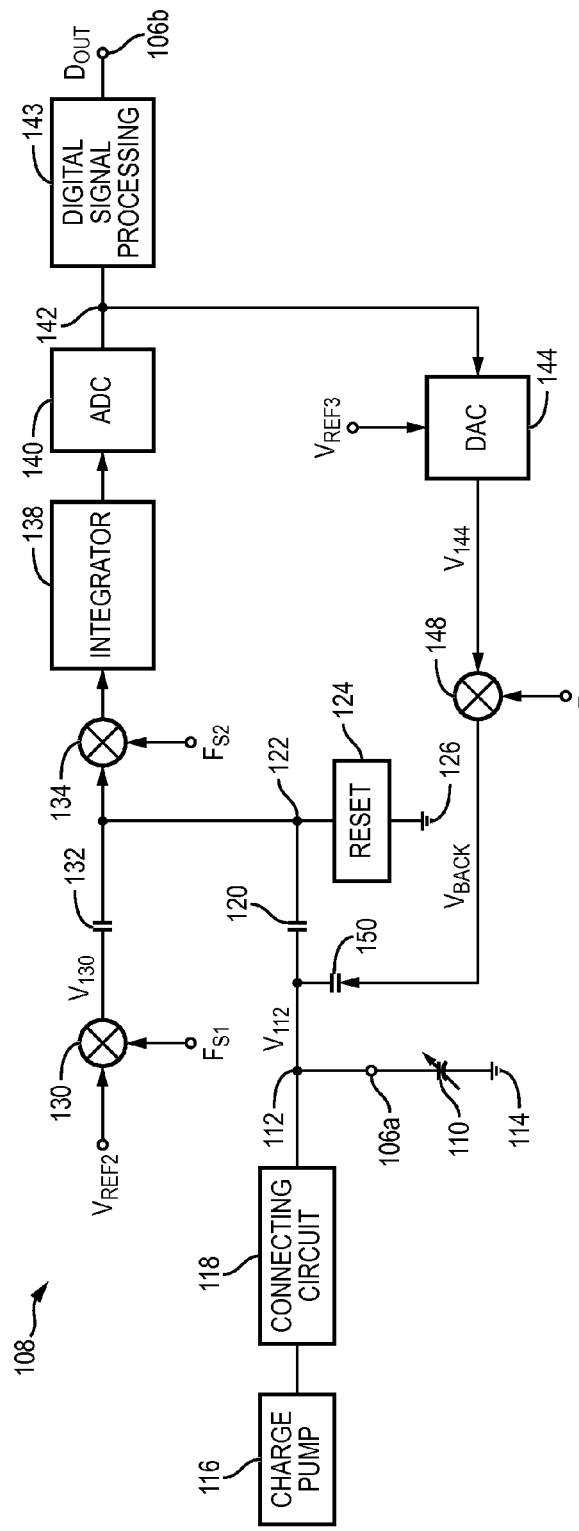
FIG. 5 is a schematic and block diagram of measurement circuit for the MEMS using a sigma-delta loop with feedback.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Semiconductor devices perform a wide range of functions such as signal processing, high-speed calculations, transmitting and receiving electromagnetic signals, controlling operation of electronic devices, and controlling movement of mechanical devices. Semiconductor devices are found in the fields of communications, power conversion, mechanical control, networks, computers, and consumer products. Semiconductor devices are also found in military applications, aviation, automotive, industrial controllers, and office equipment.

FIG. 3 illustrates a MEMS 100 for use in one or more of the above applications. For example, MEMS 100 can be a comb actuator, lens for cell phone camera, moveable mirror, accelerometer, or gyro, just to name a few. MEMS 100 may exhibit a capacitance from two electrodes or elements with a dielectric medium between the electrodes. The capacitance of MEMS 100 changes with the relative distance or displacement between the two electrodes. In the case of a lens for a camera, capacitance changes by movement of the focal point of the lens, or by movement of the lens with respect to a sensor, i.e., capacitance varies with displacement of the lens. The movement or displacement of the lens can be determined by measuring the capacitance of MEMS 100. The present displacement, position, state, and operation of MEMS 100 can be controlled by measuring changes in the capacitance.

A semiconductor device 102 is a component located separate and apart in proximity and electrically coupled to MEMS 100. Semiconductor device 102 contains a semiconductor die having analog and digital circuits implemented as active devices, passive devices, conductive layers, and dielectric layers formed within the die and electrically interconnected according to the electrical design and function of the die. For example, the circuit may include one or more transistors, diodes, and other circuit elements formed within the active surface of the die to implement analog and digital circuits, such as an amplifier, modulator, demodulator, integrator, ADC, DAC, or other signal processing circuit. Semiconductor device 102 may also contain integrated passive devices (IPDs), such as inductors, capacitors, and resistors. The semiconductor die includes a base substrate material, such as silicon, germanium, aluminum phosphide, aluminum arsenide, gallium arsenide, gallium nitride, indium phosphide, silicon carbide, or other bulk semiconductor material for structural support. FIG. 4 illustrates a semiconductor package 104 enclosing the semiconductor die for structural support and environmental protection. Semiconductor package 104 includes pins 106 for interconnection with other system components, including MEMS 100.

In particular, semiconductor package 104 contains a measurement circuit 108 embodied as a semiconductor die electrically coupled to separate MEMS 100 for measuring a state or value of the MEMS. Measurement circuit 108 is coupled through one or more pins 106 of semiconductor package 104 to MEMS 100. In one embodiment, measurement circuit 108 as disposed within semiconductor package 104 measures a capacitance of MEMS 100 which is disposed within a separate semiconductor package or other physical structure. Accordingly, measurement circuit 108 measures MEMS 100 which is located outside semiconductor package 104.

FIG. 5 is a schematic and block diagram of measurement circuit 108 for measuring the capacitance of MEMS 100, represented by variable capacitor 110 ($C_{110}$) coupled between pin 106a of semiconductor package 104 at sensing node 112 and terminal 114 operating at a ground potential. Pin 106a operates as sensing electrode of semiconductor package 104 externally connects to MEMS 100 and measures the value of capacitor 110, which is representative of the present displacement, position, state, or operation of the MEMS.

Charge pump 116 is coupled through connecting circuit 118 to sensing node 112 to change the voltage $V_{112}$ across capacitor 110, which creates an electric field that imposes a force on MEMS 100, e.g., to induce movement of the lens. Connecting circuit 118 can be a transistor, resistor, or electronic switch. The value of MEMS capacitor 110 is then measured to determine the amount of the displacement or the new position or state of MEMS 100 caused by application of the charge pump voltage. Capacitor 120 ($C_{120}$) is coupled between node 112 and node 122. Reset circuit 124 is coupled between node 122 and terminal 126 operating at a ground potential. Reset circuit 124 can be a transistor or electronic switch.

A DC reference voltage $V_{REF2}$ is applied to a first input of modulator 130. A second input of modulator 130 receives modulating clock signal $F_{S1}$ to phase or amplitude modulate the reference voltage $V_{REF2}$. Capacitor 132 ($C_{132}$) is coupled between an output of modulator 130 and node 122. Demodulator 134 has a first input coupled to node 122, and second input receiving clock signal $F_{S2}$ for demodulating the signal at node 122. An output of demodulator 134 is coupled to an input of integrator 138. The integrator 138 integrates the difference between the input path and feedback path of the sigma-delta loop. If the input/feedback difference is non-zero, integrator 138 drives the output of the loop until the difference converges to zero. An output of integrator 138 is coupled to an input of ADC 140. An output of ADC 140 is coupled to an optional digital signal processing block 143 at node 142 for calibration or filtering. Either node 142 or the output of digital signal processing block 143 provides a digital code $D_{OUT}$ representative of the value of capacitor 110 to pin 106b of semiconductor package 104.

The output of ADC 140 is also coupled to an input of digital-to-analog converter (DAC) 144. DAC 144 also receives DC reference voltage $V_{REF3}$. An output of DAC 144 is coupled to a first input of modulator 148. A second input of modulator 148 receives clock signal $F_{S3}$ to phase or amplitude modulate the output signal of DAC 144. The output of modulator 148 provides feedback voltage $V_{BACK}$. Capacitor 150 ($C_{150}$) is coupled between an output of modulator 148 and sensing node 112. DAC 144, modulator 148, and capacitor 150 constitute a feedback circuit between the output of ADC 140 and sensing node 112.

Measurement circuit 108 uses a sigma-delta loop with feedback to measure the capacitance of MEMS 100 by sensing changes in voltage at node 112 in response to feedback voltage $V_{BACK}$ applied to the capacitor divider including $C_{110}$, $C_{120}$, and $C_{150}$. The sigma-delta loop provides a digital signal $D_{OUT}$ representing the capacitance of MEMS 100 at node 142 or pin 106b of semiconductor package 104 with high resolution in a compact circuit layout. The function of measurement circuit 108 can be described by the following principles of operation and associated equations.

Assume connecting circuit 118 and reset circuit 124 are closed or low impedance. The voltage from charge pump 116 is applied to node 112 and capacitor 110 to impose a force and cause displacement or other change of position, state, or operation of MEMS 100. Capacitors 120 and 150 provide galvanic isolation for reset circuit 124, demodulator 134, integrator 138, ADC 140, DAC 144, and modulator 148 from the high voltage from charge pump 116 on node 112, i.e., the voltage required to displace MEMS 100 can be greater than the breakdown voltage of the active circuits. Connecting circuit 118 and reset circuit 124 are opened or set to high impedance, i.e., connecting circuit 118 and reset circuit 124 are disabled during the measurement phase of capacitor 110. Alternatively, connecting circuit 118 remains closed and reset circuit 124 is opened or set to high impedance. The value of capacitor 110 is representative or indicative of the displacement, position, state, and operation of MEMS 100 after application of the force by charge pump 116.

Figure 6:
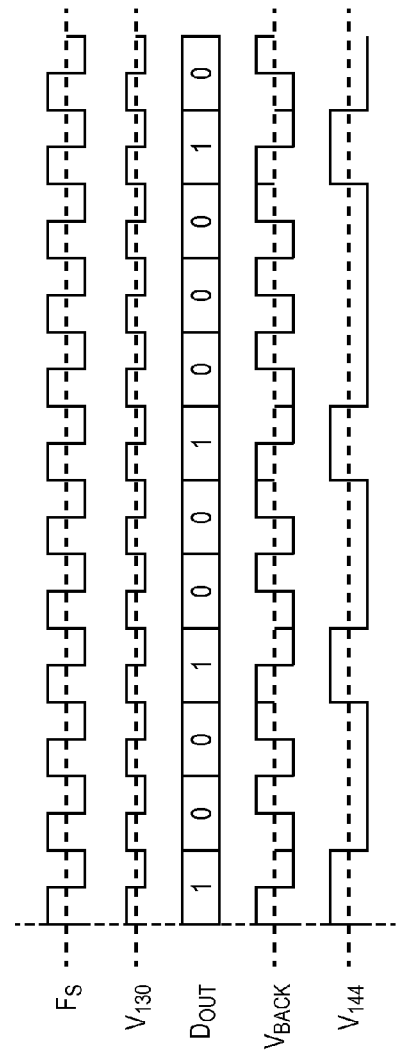
FIG. 6 illustrates waveform plots of the operation of the sigma-delta loop.

The DC reference voltage $V_{REF2}$ is phase or amplitude modulated by clock signal $F_{S1}$ through modulator 130. In one embodiment, $F_{S1}=F_{S2}=F_{S3}$, and generally designated as $F_S$. In another embodiment, $F_{S1}$, $F_{S2}$, and $F_{S3}$ each exhibit different phase, delay, or duty cycle of a common or synchronous clock frequency. Modulators 130, 148, demodulator 134, and clock signals $F_{S1}$-$F_{S3}$ can be a +1/−1 squarewave modulator, 0-1 squarewave modulator, triangular modulator, sawtooth modulator, sine wave modulator, or other periodic modulator. $V_{REF2}$ and $V_{REF3}$ are stable DC reference voltages. The output signal of modulator 130 is designated as $V_{130}$ with voltage variation $\Delta V_{130}$ indicating the change in $V_{130}$ due to the modulation of $V_{REF2}$ by $F_{S1}$. FIG. 6 shows waveform plots of $F_S$ and $V_{130}$. The feedback voltage $V_{BACK}$ causes a change in voltage $V_{112}$ ($\Delta V_{112}$) at sensing node 112 through capacitors 110, 120, and 150. It is the voltage variation $\Delta V_{112}$ that is the value of interest, i.e., $\Delta V_{112}$ in response to $V_{BACK}$ through capacitor 150 is relevant to the measurement operation of the sigma-delta loop to determine the unknown value of capacitor 110 which is representative of the present displacement, position, state, and operation of MEMS 100.

The total sum of the charges ($Q_T$) that is transferred to integrator 138 comes from two sources, i.e., voltage variation $\Delta V_{112}$ through capacitor 120 and voltage variation $\Delta V_{130}$ through capacitor 132, with modulation by clock signal $F_{S1}$ in modulator 130 and by clock signal $F_{S3}$ in modulator 148, and demodulation by clock signal $F_{S2}$ in demodulator 134. The integrator 138 integrates total charge $Q_T$ from capacitors 120 and 132 and provides an averaged integrated signal to ADC 140. As the sigma-delta loop converges, $Q_T$ approaches an average value of zero. Given that $\Delta V_{130}$, capacitor 120, and capacitor 132 are fixed, the information content of the total charge $Q_T$ to integrator 138 becomes a function of $\Delta V_{112}$ in response to the feedback $V_{BACK}$ through capacitor 150, as expressed in equation (1):

$$Q_T = C_{120} \times \Delta V_{112} - C_{132} \times \Delta V_{130} \quad (1)$$

FIG. 6 shows a waveform plot of $V_{144}$ and $V_{BACK}$. The voltage $\Delta V_{112}$ varies with the change in feedback voltage $V_{BACK}$ ($\Delta V_{BACK}$) operating through the capacitive divider $C_{110}$, $C_{120}$, and $C_{150}$ ($C_{120}$ referenced to virtual ground) in accordance with equation (2).

$$\Delta V_{112} = \frac{C_{150}}{C_{110} + C_{120} + C_{150}} \times \Delta V_{BACK} \quad (2)$$

Assuming modulators 130 and 148 have unity gain, $\Delta V_{BACK}$ is equal to the output voltage of DAC 144 ($V_{REF3} \times D_{OUT}$), and $\Delta V_{130}$ is equal to $V_{REF2}$, as shown in equations (3) and (4). $D_{OUT}$ is a bit stream having information context expressed in the density of certain values within the bit stream. The sigma-delta loop integrates the difference between the input path and feedback path and drives the output of the loop until the difference converges to zero. FIG. 6 shows a waveform plot of the digital code $D_{OUT}$.

$$\Delta V_{BACK} = V_{REF3} \times D_{OUT} \quad (3)$$

$$\Delta V_{130} = V_{REF2} \quad (4)$$

Combining equations (1)-(4), the charge $Q_T$ that is injected into integrator 138 each cycle is shown in equation (5):

$$Q_T = C_{120} \times \frac{C_{150}}{C_{110} + C_{120} + C_{150}} \times V_{REF3} \times D_{OUT} - C_{132} \times V_{REF2} \quad (5)$$

The sigma-delta loop converges as $Q_T$ approaches an average value of zero. Given that $C_{120}$, $C_{132}$, $C_{150}$, $V_{REF2}$, and $V_{REF3}$ are fixed, $D_{OUT}$ changes linearly with $C_{110}$, which is representative of the present displacement, position, state, and operation of MEMS 100. Assuming the feedback through $C_{150}$ is stable, the closed loop sigma-delta function at the input of integrator 138 can be expressed as equation (6) with $\langle Q_T \rangle$ and $\langle D_{OUT} \rangle$ indicating average values.

$$\langle Q_T \rangle = \quad (6)$$
$$C_{120} \times \frac{C_{150}}{C_{110} + C_{120} + C_{150}} \times V_{REF3} \times \langle D_{OUT} \rangle - C_{132} \times V_{REF2} = 0$$

By setting $V_{REF3} = -V_{REF2}$, the relationship between $D_{OUT}$ and $C_{110}$ can be expressed in equations (7)-(8):

$$\langle D_{OUT} \rangle = A \times (C_{110} + C_{120} + C_{150}) \quad (7)$$

$$A = \frac{1}{C_{150}} \times \frac{C_{132}}{C_{120}} \times \frac{V_{REF2}}{V_{REF3}} \quad (8)$$

From equations (7)-(8), the digital code $D_{OUT}$ is directly related to the unknown or indeterminate value of capacitor 110, which is representative of the present displacement, position, state, or operation of MEMS 100, i.e., $D_{OUT}$ identifies the measured value of capacitance $C_{110}$ which is linearly related to the displacement or state of MEMS 100.

In summary, following a force imposed on MEMS 100 by charge pump 116, the value of capacitor 110 (new displacement, position, or state of the MEMS) is unknown. Capacitors 120 and 150 maintain galvanic isolation between the high voltage from charge pump 116 needed to control MEMS 100 and the active circuits (reset circuit 124, integrator 138, ADC 140, DAC 144, modulator 148, demodulator 134) used to measure the value of capacitor 110.

The integrator 138 integrates total charge $Q_T$ from capacitors 120 and 132 and provides an averaged integrated signal to ADC 140. ADC 140 converts the averaged integrated signal to a digital code $D_{OUT}$ as a measurement of the displacement, position, state, or operation of MEMS 100. The value of capacitor 110 can be determined from the voltage variation $\Delta V_{112}$ as a function of capacitor 110 from the digital code $D_{OUT}$ of ADC 140 as made available at pin 106b of semiconductor package 104. The digital code $D_{OUT}$ identifies the value of capacitor 110. $D_{OUT}$ can be sampled or continuously acquired to determine the displacement, position, state, or operation of MEMS 100.

The sigma-delta loop includes a feedback loop comprising DAC 144, modulator 148, and capacitor 150 that converts $D_{OUT}$ from ADC 140 into an analog feedback signal $V_{BACK}$ based on DC reference voltage $V_{REF3}$. The voltage variation $V_{112}$ is thus determined by the values of capacitors 110, 120, and 150 and the feedback signal $V_{BACK}$. The measurement of capacitor 110 determines the actual displacement, position, state, or operation of MEMS 100 in response to the force imposed by charge pump 116. Measurement circuit 108 provides digital code $D_{OUT}$ representative of the measurement of capacitor 110 in a compact circuit layout. Based on the measurement of capacitor 110, an adjustment can be made to MEMS 100 by application of another force imposed by charge pump 116 and the value of capacitor 110 is again measured. The process repeats continuously to measure the intended displacement, position, or state of MEMS 100.

Measurement circuit 108 provides both the high voltage electrode needed to change the state of MEMS 100 and isolation from the high voltage for circuits to measure the capacitance $C_{110}$. The values of gain A, $C_{120}$, $C_{132}$, $C_{150}$, $V_{REF2}$, and $V_{REF3}$ are chosen such that digital code $D_{OUT}$ remains within a given range (e.g. 0-1, +1/−1, or other defined range) under the condition that the input range is made smaller than the reference voltages in sigma-delta loop. For example, to measure a value of capacitor 110 between 25-300 picofarads (pF) with digital code $D_{OUT}$ between 0-1, then the values may be set as $C_{120}$=1 pF, $C_{132}$=0.5 pF, $C_{150}$=25 pF, $V_{REF1}$=2 V, $V_{REF2}$=150 millivolts (mV), and $V_{REF3}$=2 V.

In another embodiment, gain A can be varied by employing integrator 138 to integrate charges from capacitor 132 on a reduced schedule, i.e., less frequently, relatively integrating the charges coming through capacitor 120. The measurement circuit can be configured with one or more sensing electrodes (106a) and one or more source electrodes (106b).

Figure 7A:
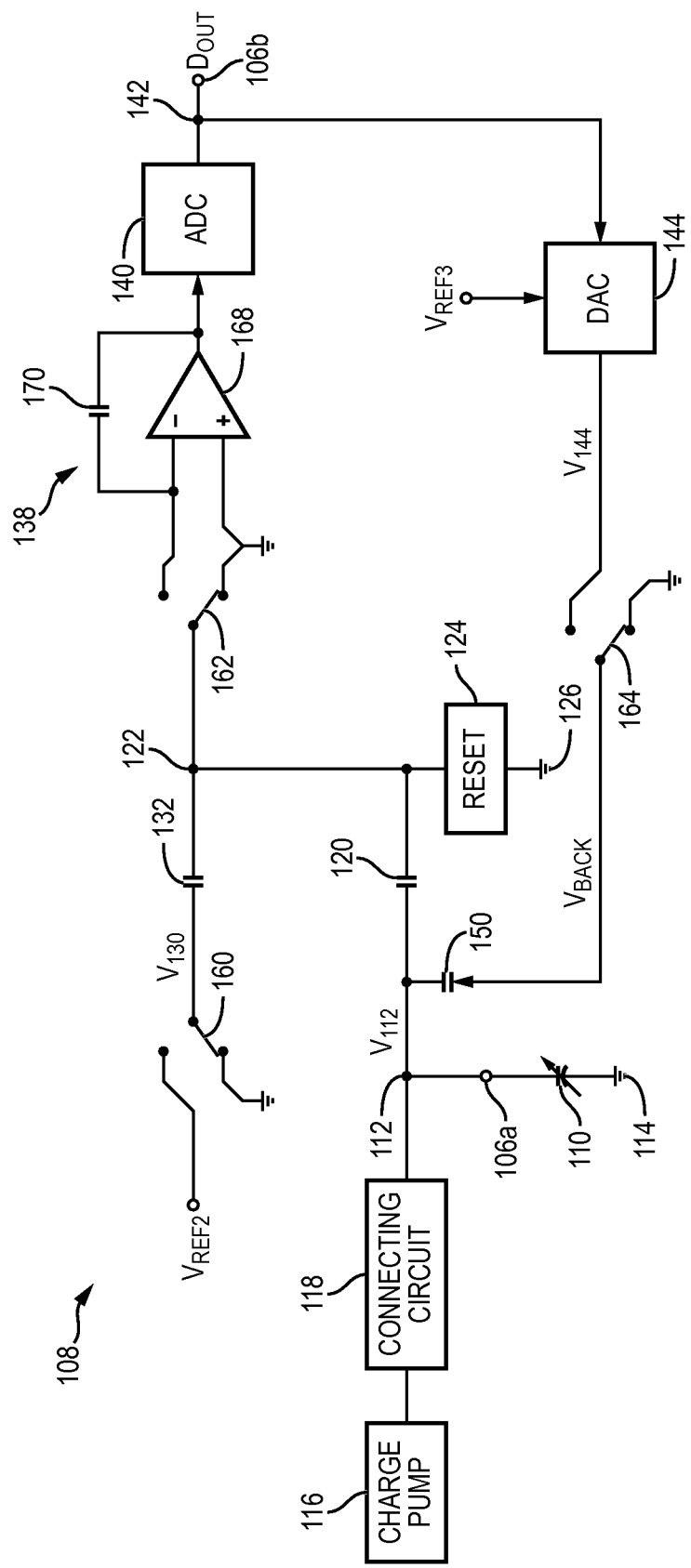
FIGS. 7a-7d are a schematic and block diagram of measurement circuit during various phases of operation of the sigma-delta loop and feedback.

FIGS. 7a-7d illustrate further detail of one representative example of four operational phases of measurement circuit 108 in accordance with FIG. 5. Modulators 130 and 148 and demodulator 134 are represented by switching circuits 160, 162, and 164, respectively, with unity gain to provide a simplified explanation of the operation of measurement circuit 108. The integrator 138 is implemented with amplifier 168 and capacitor 170. During operational phase 1 of measurement circuit 108, as shown in FIG. 7a, the charges on capacitors 120, 132, and 150 are discharged and reset. Switching circuit 160 is set to connect capacitor 132 to a ground reference voltage, switching circuit 162 is set to connect capacitors 120 and 132 to a ground reference voltage, and switching circuit 164 is set to connect capacitor 150 to a ground reference voltage.

Figure 7B:
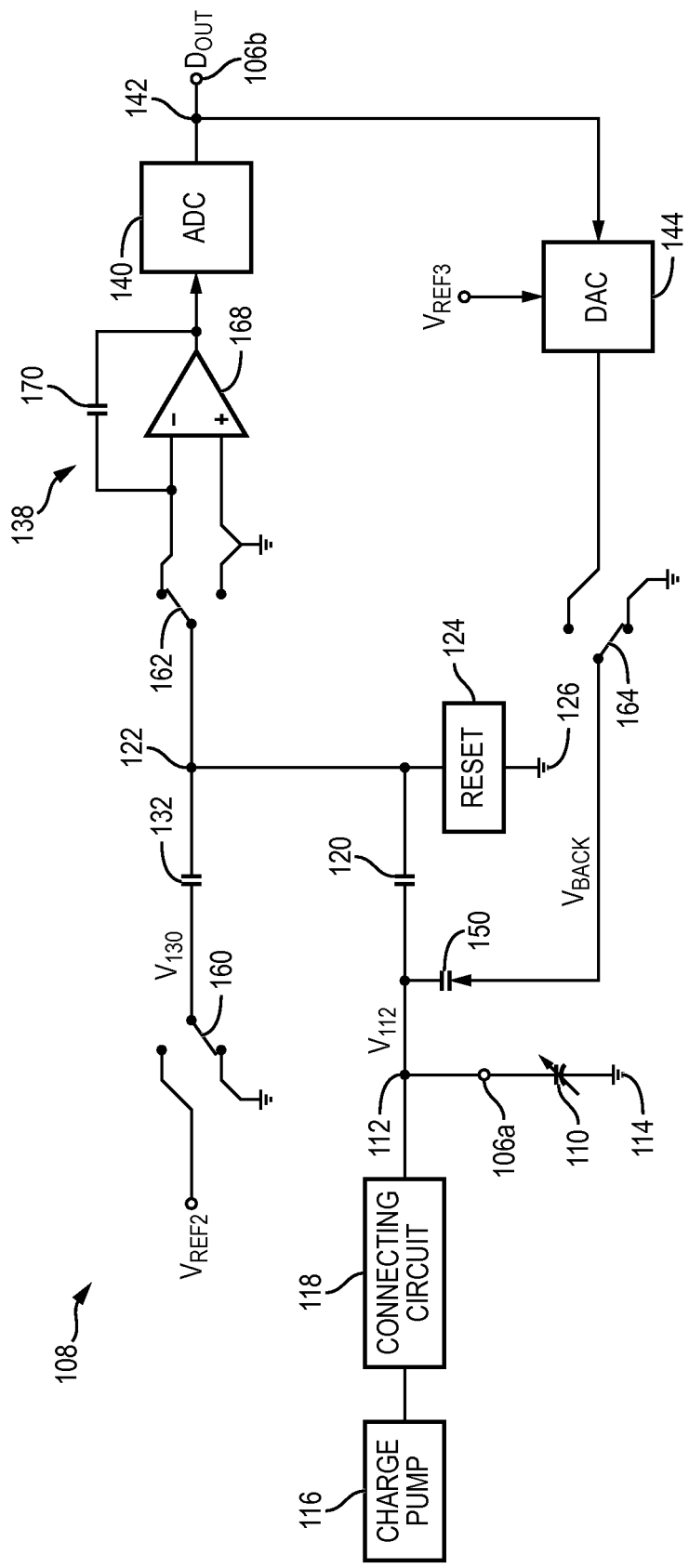

During operational phase 2 of measurement circuit 108, as shown in FIG. 7b, switching circuit 162 is set to connect node 122 to the inverting input of amplifier 168 to accumulate the charge from capacitors 120 and 132.

Figure 7C:
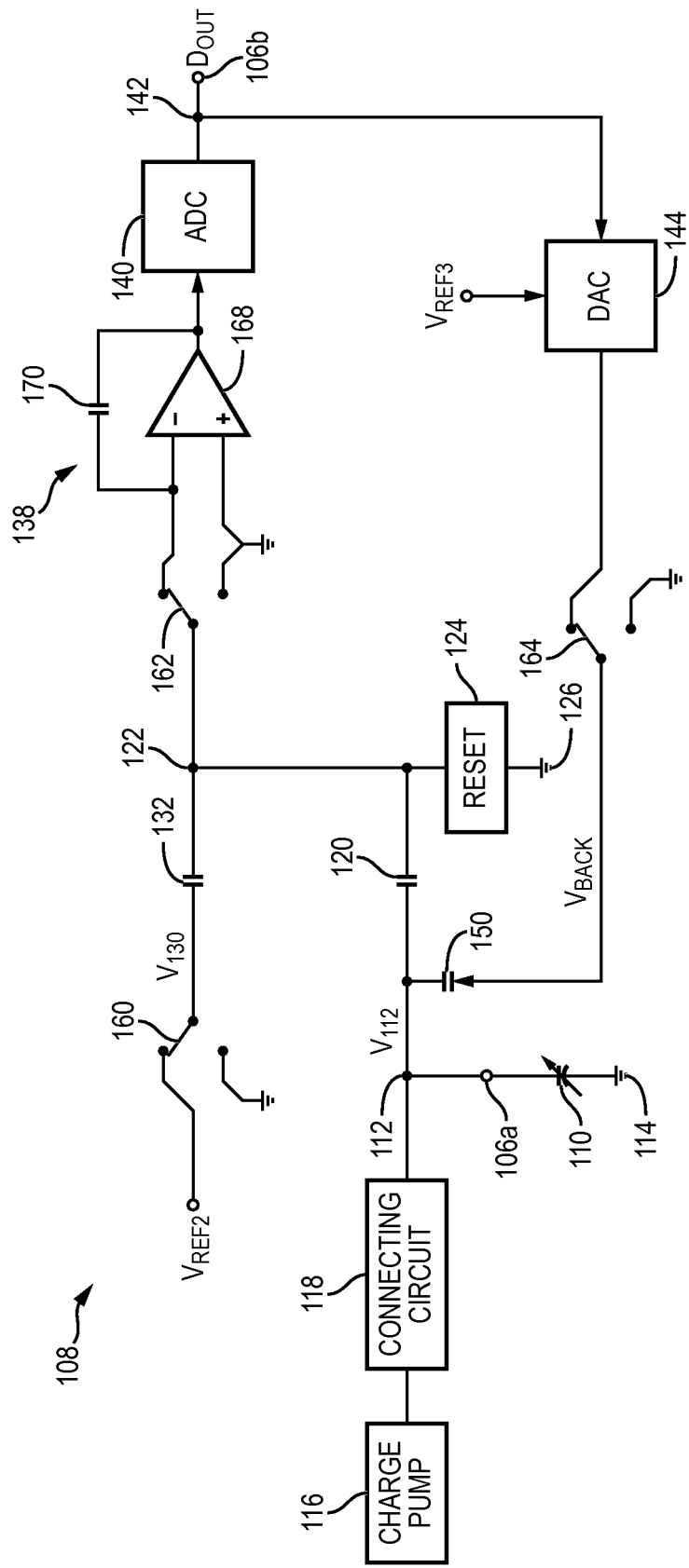

During operational phase 3 of measurement circuit 108, as shown in FIG. 7c, switching circuit 160 is set to connect reference voltage $V_{REF2}$ to capacitor 132 and accumulate charges on integrator 168-170. Switching circuit 164 is set to connect the output of DAC 144 to capacitor 150 to complete the feedback and allow $V_{BACK}$ to vary the voltage $V_{112}$ based on the capacitor divider $C_{110}$, $C_{120}$, and $C_{150}$. The charges from voltage variation $\Delta V_{112}$ through capacitor 120 accumulate on integrator 168-170. The total charges $Q_T$ on integrator 168-170 converge to zero.

Figure 7D:
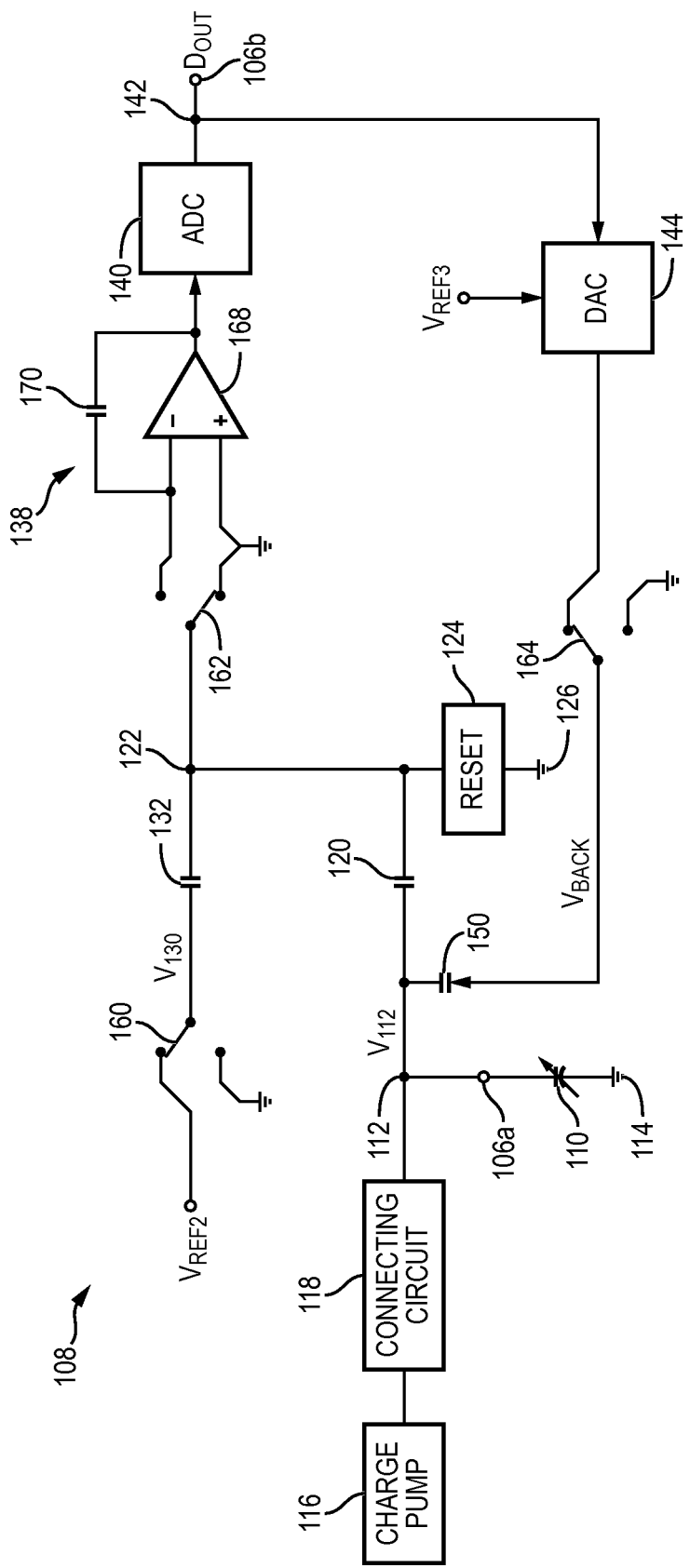

During operational phase 4 of measurement circuit 108, as shown in FIG. 7d, switching circuit 162 is set to connect node 122 to a ground reference voltage. The digital code $D_{OUT}$ is sampled or monitored continuously to determine the value of capacitor 110. Measurement circuit 108 returns to operational phase 1 to discharge and reset capacitors 120, 132, and 150 in preparation for the next measurement cycle.

Other switching schemes can be realized that inject a charge derived from a feedback signal through capacitor 120 into integrator 138. The variation in voltage at sensing node 112 is a function of capacitors 110, 120, and 150 and feedback voltage $V_{BACK}$, see equation (2). Measurement circuit 108 can be configured to measure multiple MEMS connected to a common sensing node or with additional sensing nodes.

Figure 8:
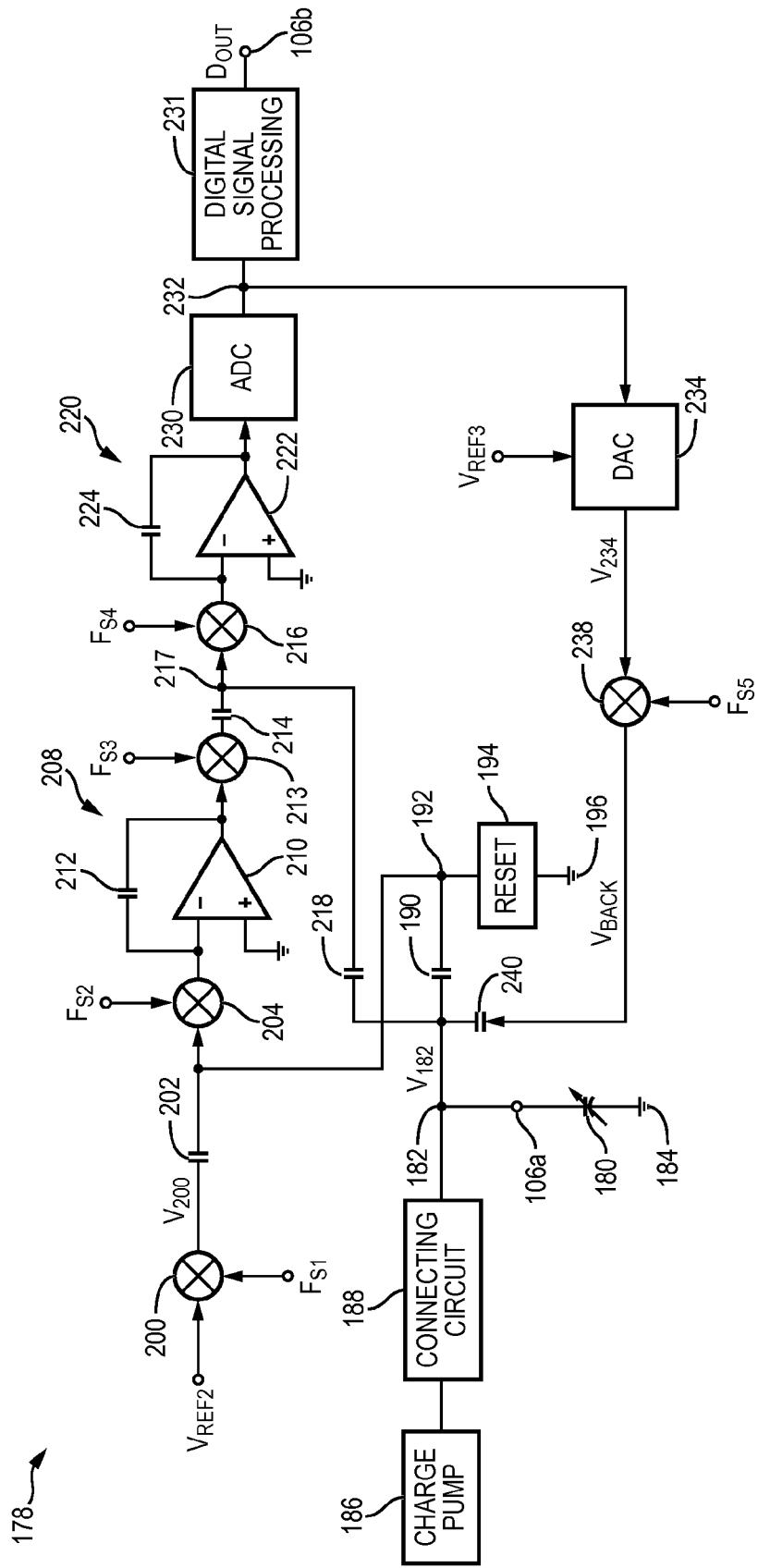
FIG. 8 is a schematic and block diagram of measurement circuit for the MEMS using a second order sigma-delta loop.

FIG. 8 illustrates a measurement circuit 178 using a second order sigma-delta loop to measure the capacitance of MEMS 100, represented by variable capacitor 180 ($C_{180}$) coupled between pin 106a of semiconductor package 104 at node 182 and terminal 184 operating at a ground potential. Pin 106a operates as sensing electrode of semiconductor package 104 externally connects to MEMS 100 and measures the value of capacitor 180, which is representative of the present displacement, position, state, or operation of the MEMS. Charge pump 186 is coupled through connecting circuit 188 to sensing node 182 to change the voltage $V_{182}$ across capacitor 180, which creates an electric field that imposes a force on MEMS 100, e.g., to induce movement of the lens. Connecting circuit 188 can be a transistor, resistor, or electronic switch. The value of MEMS capacitor 180 is then measured to determine the amount of the displacement or the new position or state of MEMS 100 caused by application of the charge pump voltage. Capacitor 190 ($C_{190}$) is coupled between node 182 and node 192. Reset circuit 194 is coupled between node 192 and terminal 196 operating at a ground potential. Reset circuit 194 can be a transistor or electronic switch.

A DC reference voltage $V_{REF2}$ is applied to a first input of modulator 200. A second input of modulator 200 receives clock signal $F_{S1}$ to phase or amplitude modulate the reference voltage $V_{REF2}$. Capacitor 202 ($C_{202}$) is coupled between an output of modulator 200 and node 192. Demodulator 204 has a first input coupled to node 192, and second input receiving clock signal $F_{S2}$ for demodulating the signal at node 192. An output of demodulator 204 is coupled to an input of integrator 208. The integrator 208 comprises amplifier 210 and capacitor 212. An output of integrator 208 is coupled to a first input of modulator 213. A second input of modulator 213 receives clock signal $F_{S3}$ to phase or amplitude modulate the output signal of integrator 208, while an output of demodulator 214 is coupled through capacitor 214 to a first input of demodulator 216 at node 217. Capacitor 218 is coupled between sensing node 182 and node 217. A second input of demodulator 216 receives clock signal $F_{S4}$ for demodulating the signal at node 217. An output of demodulator 216 is coupled to an input of integrator 220. The integrator 220 comprises amplifier 222 and capacitor 224 which, in combination with integrator 208, performs a second order integration of the difference between the input path and feedback path of the sigma-delta loop. If the input/feedback difference is non-zero, integrators 208 and 220 drive the output of the loop until the difference converges to zero.

The output of integrator 220 is coupled to ADC 230. An output of ADC 230 is coupled to an optional digital signal processing block 231 at node 232 for calibration or filtering. Either node 232 or the output of digital signal processing block 231 provides a digital code $D_{OUT}$ representative of the value of capacitor 180 to pin 106b of semiconductor package 104. The output of ADC 230 is also coupled to an input of DAC 234. DAC 234 also receives DC reference voltage $V_{REF3}$. An output of DAC 234 is coupled to a first input of modulator 238. A second input of modulator 238 receives clock signal $F_{S5}$ to phase or amplitude modulate the output signal of DAC 234. The output of modulator 238 provides feedback voltage $V_{BACK}$. Capacitor 240 ($C_{240}$) is coupled between an output of modulator 238 and sensing node 182. DAC 234, modulator 238, and capacitor 240 constitute a feedback circuit between the output of ADC 230 and sensing node 182.

Measurement circuit 178 uses a second order sigma-delta loop with feedback to measure the capacitance of MEMS 100 by sensing changes in voltage at node 182 in response to feedback voltage $V_{BACK}$ applied to the capacitor divider including $C_{180}$, $C_{190}$, $C_{218}$, and $C_{240}$. The sigma-delta loop provides a digital code $D_{OUT}$ representative of the capacitance of MEMS 100 at node 232 with high resolution in a compact circuit layout.

The function of measurement circuit 178 can be described by the following principles of operation. Assume connecting circuit 188 and reset circuit 194 are closed or low impedance. The voltage from charge pump 186 is applied to sensing node 182 and capacitor 180 to impose a force and cause displacement or other change of position, state, or operation of MEMS 100. Capacitors 190, 218, and 240 provide galvanic isolation for reset circuit 194, integrators 208 and 220, ADC 230, DAC 234, modulators 213 and 238, and demodulators 204 and 216 from the high voltage from charge pump 186 on sensing node 182, i.e., the voltage required to displace MEMS 100 can be greater than the breakdown voltage of the active circuits. The value of capacitor 180 representative or indicative of the displacement, position, state, and operation of MEMS 100 after application of the force by charge pump 186 is unknown.

Connecting circuit 188 and reset circuit 194 are opened or set to high impedance, i.e., connecting circuit 188 and reset circuit 194 are disabled during the measurement phase of capacitor 180. Alternatively, connecting circuit 188 remains closed and reset circuit 194 is opened or set to high impedance. The DC reference voltage $V_{REF2}$ is phase or amplitude modulated by clock signal $F_{S1}$ through modulator 200. In one embodiment, $F_{S1}=F_{S2}=F_{S3}=F_{S4}=F_{S5}$. In another embodiment, $F_{S1}$, $F_{S2}$, $F_{S3}$, $F_{S4}$, and $F_{S5}$ each exhibit different phase, delay, or duty cycle of a common or synchronous clock frequency. Modulators 200, 213, 238, demodulators 204, 216, and clock signals $F_{S1}$-$F_{S5}$ can be a +1/−1 squarewave modulator, 0-1 squarewave modulator, triangular modulator, sawtooth modulator, sine wave modulator, or other periodic modulator. $V_{REF2}$ and $V_{REF3}$ are stable DC reference voltages. The output signal of modulator 200 is designated as $V_{200}$ with $\Delta V_{200}$ indicating the change in $V_{200}$ due to the modulation of $V_{REF2}$ by $F_{S1}$. The feedback voltage $V_{BACK}$ causes a voltage variation $\Delta V_{182}$ at sensing node 182 through capacitors 180, 190, 218, and 240. It is voltage variation $\Delta V_{182}$ that is the value of interest, i.e., $\Delta V_{182}$ in response to $V_{BACK}$ through capacitor 240 is relevant to the measurement operation of the sigma-delta loop to determine the unknown value of capacitor 180 which is representative of the present displacement, position, state, and operation of MEMS 100. The charge that is transferred to integrator 208 comes from two sources, i.e., $\Delta V_{182}$ through capacitor 190 and $\Delta V_{200}$ through capacitor 202, modulated by clock signal $F_{S2}$ in demodulator 204. The output of integrator 208, as well as the charge from voltage variation $\Delta V_{182}$ through capacitor 218, is applied to the input of integrator 220. As the second order sigma-delta loop converges, the total charges approach an average value of zero. Given that $\Delta V_{200}$, capacitor 190, capacitor 218, and capacitor 202 are fixed, the information content of the total charge $Q_T$ to integrators 208 and 220 becomes a function of voltage variation $\Delta V_{182}$ in response to the feedback $V_{BACK}$ through capacitor 240.

ADC 230 provides a digital code $D_{OUT}$ as a measurement of the displacement, position, state, or operation of MEMS 100. The digital code $D_{OUT}$ is directly related to the unknown or indeterminate value of capacitor 180, which is representative of the present displacement, position, state, or operation of MEMS 100, i.e., $D_{OUT}$ identifies the measured value of capacitance $C_{180}$ which is linearly related to the displacement or state of MEMS 100. The value of capacitor 180 can be determined from the change in the voltage at node 182 as a function of capacitor 180 from the digital code $D_{OUT}$ of ADC 230 as made available at pin 106b of semiconductor package 104. The digital code $D_{OUT}$ identifies the value of capacitor 180. $D_{OUT}$ can be sampled or continuously acquired to determine the displacement, position, state, or operation of MEMS 100. The sigma-delta loop includes a feedback loop comprising DAC 234, modulator 238, and capacitor 240 that converts $D_{OUT}$ from ADC 230 into an analog feedback signal $V_{BACK}$ based on DC reference voltage $V_{REF3}$. The measurement of capacitor 180 determines the actual displacement, position, state, or operation of MEMS 100 in response to the force imposed by charge pump 186. Measurement circuit 178 providing digital code $D_{OUT}$ increases resolution of the measurement of capacitor 180 in a compact circuit layout. Based on the measurement of capacitor 180, an adjustment can be made to MEMS 100 by application of another force imposed by charge pump 186 and the value of capacitor 180 is again measured. The process repeats continuously to measure the intended displacement, position, or state of MEMS 100.

While one or more embodiments of the present invention have been illustrated in detail, the skilled artisan will appreciate that modifications and adaptations to those embodiments may be made without departing from the scope of the present invention as set forth in the following claims.

What is claimed:

1. A measurement circuit for a microelectromechanical system (MEMS), comprising:
    a sensing node for measuring a state of the MEMS;
    an integrator;
    a first capacitor including a first terminal of the first capacitor connected to the sensing node and a second terminal of the first capacitor connected to an input of the integrator, wherein the input of the integrator is connected to the sensing node through the first capacitor;
    a reference voltage circuit node connected to the second terminal of the first capacitor;
    an analog-to-digital converter (ADC) including an input coupled to an output of the integrator and an output providing a digital signal representative of the state of the MEMS;
    a digital-to-analog converter (DAC) including an input coupled to the output of the ADC; and
    a second capacitor including a first terminal of the second capacitor connected to an output of the DAC and a second terminal of the second capacitor connected to the sensing node, wherein the input of the integrator is connected to the output of the DAC through the first capacitor and second capacitor.

2. The measurement circuit of claim 1, wherein the MEMS includes a capacitance and the digital signal at the output of the ADC is representative of the capacitance of the MEMS.

3. The measurement circuit of claim 1, further including:
    a modulator including a first input coupled for receiving a reference voltage from the reference voltage circuit node and a second input coupled for receiving a modulating signal;
    a demodulator including a first input coupled to the second terminal of the first capacitor, a second input of the demodulator coupled for receiving a demodulating signal, and an output of the demodulator coupled to the input of the integrator; and
    a third capacitor coupled between an output of the modulator and the first input of the demodulator.

4. The measurement circuit of claim 1, further including a modulator comprising a first input coupled to the output of the DAC and a second input coupled for receiving a modulating signal.

5. The measurement circuit of claim 1, further including a charge pump coupled to the sensing node and configured to apply a force to the MEMS.

6. The measurement circuit of claim 1, further including a semiconductor package containing the measurement circuit with a pin of the semiconductor package coupled to the sensing node.

7. A method of measuring a microelectromechanical system (MEMS), comprising:
   sensing a state of the MEMS as a first voltage variation at a sensing node;
   transferring the first voltage variation through a first capacitor to a second node as a first signal;
   providing a second voltage variation through a second capacitor to the second node as a second signal;
   integrating a total charge from the first capacitor and second capacitor at the second node to provide an integrated signal;
   converting the integrated signal to a digital signal representative of the state of the MEMS;
   converting the digital signal to an analog signal; and
   routing the analog signal through a third capacitor to the sensing node.

8. The method of claim 7, wherein the MEMS includes a capacitance and the digital signal is representative of the capacitance of the MEMS.

9. The method of claim 7, further including:
   modulating a reference voltage with a modulating signal to generate the second voltage variation through the second capacitor; and
   demodulating the first signal and second signal prior to the integration.

10. The method of claim 7, further including modulating the analog signal with a modulating signal to the third capacitor.

11. The method of claim 7, further including:
   providing a charge pump; and
   applying a voltage from the charge pump to the sensing node to modify a position of the MEMS.

12. A semiconductor device for measuring a microelectromechanical system (MEMS), comprising:
   a sensing node for measuring the MEMS;
   a first integrator;
   a first capacitor coupled in series between the sensing node and an input of the first integrator;
   a reference voltage node;
   a second capacitor coupled in series between the reference voltage node and the input of the first integrator, wherein the sensing node and reference voltage node are coupled to the integrator in parallel through the first capacitor and second capacitor respectively;
   an analog-to-digital converter (ADC) including an input coupled to an output of the first integrator and an output providing a digital signal representative of a state of the MEMS; and
   a feedback circuit coupled between the output of the ADC and the sensing node with the feedback circuit including a third capacitor coupled in series between the output of the ADC and the sensing node.

13. The semiconductor device of claim 12, wherein the MEMS includes a capacitance and the digital signal is representative of the capacitance of the MEMS.

14. The semiconductor device of claim 12, further including:
   a modulator including a first input coupled for receiving a reference voltage from the reference voltage node, a second input of the modulator coupled for receiving a modulating signal, and an output of the modulator coupled to the second capacitor; and
   a demodulator including a first input coupled to the first capacitor and second capacitor, second input coupled for receiving a demodulating signal, and output coupled to the input of the integrator.

15. The semiconductor device of claim 12, wherein the feedback circuit includes a digital-to-analog converter (DAC) including an input coupled to the output of the ADC and an output of the DAC coupled to the third capacitor.

16. The semiconductor device of claim 15, further including a modulator including a first input coupled to the output of the DAC and a second input coupled for receiving a modulating signal with the second capacitor coupled between an output of the modulator and the sensing node.

17. The semiconductor device of claim 12, further including:
   a second integrator including an input coupled to the output of the first integrator and an output coupled to the input of the ADC; and
   a fourth capacitor coupled between the sensing node and the input of the second integrator.

18. The semiconductor device of claim 12, further including a charge pump coupled to the sensing node.

19. The semiconductor device of claim 12, further including a semiconductor package containing the semiconductor device with a pin of the semiconductor package coupled to the sensing node.

* * * * *